United States Patent [19]
Bovir et al.

[11] Patent Number: 5,144,688
[45] Date of Patent: Sep. 1, 1992

[54] METHOD AND APPARATUS FOR VISUAL PATTERN IMAGE CODING

[75] Inventors: Alan C. Bovir, Buda; Dapang Chen, Austin, both of Tex.

[73] Assignee: Board of Regents The University of Texas System

[21] Appl. No.: 498,587

[22] Filed: Mar. 23, 1990

[51] Int. Cl.$^5$ .............................. G06K 9/00
[52] U.S. Cl. ................................. 382/56; 382/21
[58] Field of Search ................ 382/56, 21, 22, 51; 358/429, 433

[56] References Cited

U.S. PATENT DOCUMENTS

| | | |
|---|---|---|
| 4,281,312 | 7/1981 | Knudson . |
| 4,567,518 | 1/1986 | Driessen . |
| 4,606,069 | 8/1986 | Johnson . |
| 4,668,996 | 5/1987 | Chen et al. . |
| 4,783,841 | 11/1988 | Crayson . |
| 4,814,871 | 3/1989 | Keesen et al. . |
| 4,831,659 | 5/1989 | Miyaoka et al. .............. 382/56 |

OTHER PUBLICATIONS

Levine, M., "Vision in Man and Machine", McGraw-Hill (1985) pp. 25-57.

Rosenfeld et al., "Digital Picture Processing", Academic Press (1982) pp. 84-112.

Kaufman; "Perception The World Transformed", Oxford University Press (1979) pp. 135-146.

Primary Examiner—David K. Moore
Attorney, Agent, or Firm—Arnold, White & Durkee

[57] ABSTRACT

An improved method for coding and decoding digital images by partitioning images into blocks and coding each image separately according to visually significant responses of the human eye. Coding is achieved by calculating and subtracting a mean intensity value from digital numbers within each block or partition and detecting visually perceivable edge locations within the resultant residual image block. If a visually perceivable edge is contained within the block, gradient magnitude and orientation at opposing sides of the edge within each edge block are calculated and appropriately coded. If no perceivable edge is contained within the block, the block is coded as a uniform intensity block. Decoding requires receiving coded mean intensity value, gradient magnitude and pattern code, and then decoding a combination of these three indicia to be arranged in an orientation substantially similar to the original digital image.

2 Claims, 6 Drawing Sheets

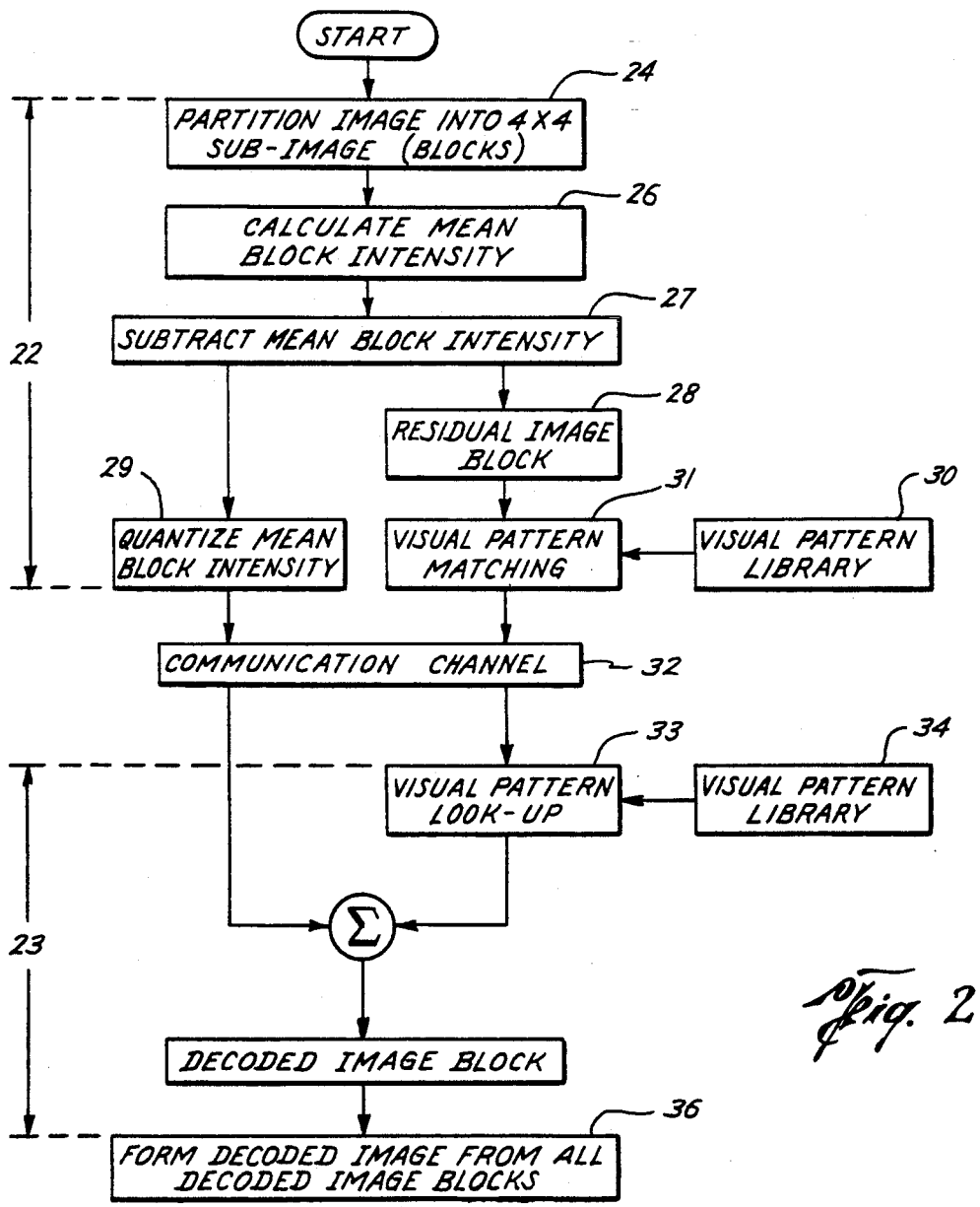

Fig. 5a

$$p_1: \begin{pmatrix} + + + + \\ - - - - \\ - - - - \\ - - - - \end{pmatrix} \quad p_2: \begin{pmatrix} + + + + \\ + + + + \\ - - - - \\ - - - - \end{pmatrix} \quad p_3: \begin{pmatrix} + + + + \\ + + + + \\ + + + + \\ - - - - \end{pmatrix}$$

Fig. 5b

$$p_4: \begin{pmatrix} - - + + \\ - - - + \\ - - - - \\ - - - - \end{pmatrix} \quad p_5: \begin{pmatrix} - + + + \\ - - + + \\ - - - + \\ - - - - \end{pmatrix} \quad p_6: \begin{pmatrix} + + + + \\ - + + + \\ - - + + \\ - - - + \end{pmatrix} \quad p_7: \begin{pmatrix} + + + + \\ + + + + \\ - + + + \\ - - + + \end{pmatrix}$$

Fig. 5c

$$p_8: \begin{pmatrix} - - - + \\ - - - + \\ - - - + \\ - - - + \end{pmatrix} \quad p_9: \begin{pmatrix} - - + + \\ - - + + \\ - - + + \\ - - + + \end{pmatrix} \quad p_{10}: \begin{pmatrix} - + + + \\ - + + + \\ - + + + \\ - + + + \end{pmatrix}$$

Fig. 5d

$$p_{11}: \begin{pmatrix} - - - - \\ - - - - \\ - - - + \\ - - + + \end{pmatrix} \quad p_{12}: \begin{pmatrix} - - - - \\ - - - + \\ - - + + \\ - + + + \end{pmatrix} \quad p_{13}: \begin{pmatrix} - - - + \\ - - + + \\ - + + + \\ + + + + \end{pmatrix} \quad p_{14}: \begin{pmatrix} - - + + \\ - + + + \\ + + + + \\ + + + + \end{pmatrix}$$

| ALGORITHM | I | | II | |
|---|---|---|---|---|
| GRADIENT MAG. MIN. | 30 | | 10 | |
| GRADIENT MAG. MAX. | 30 | | 90 | |
| M | 1 | | 8 | |
| BLOCK TYPE | UNIFORM | EDGE | UNIFORM | EDGE |
| BLOCK TYPE INDICATOR | 1 | 1 | 1 | 1 |
| MEAN INTENSITY | 5 | 3 | 6 | 4 |
| PATTERN INDEX | | 2 | | 3 |
| GRADIENT INDEX | | | | 3 |
| POLARITY INDICATOR | | 1 | | 1 |
| TOTAL BITS | $n_u = 6$ | $n_e = 7$ | $n_u = 7$ | $n_e = 12$ |
| TOTAL BPP | (0.375, 0.4375) | | (0.4375, 0.75) | |
| COMPRESSION RATIOS | (18.29, 21.33) | | (10.67, 18.29) | |

Fig. 6

METHOD AND APPARATUS FOR VISUAL PATTERN IMAGE CODING

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This invention relates to an improved method and apparatus for coding and decoding digital images. More particularly, the present invention is directed towards visual pattern image coding which partitions an image into image blocks, each image block being reducible into mean intensity value, image code, and gradient magnitude. These three indicia represent a more efficient method of coding complex digital images. Furthermore, the invention represents a substantial improvement in terms of the trade offs between image quality, computational speed, and data compression over conventional image coding and decoding techniques.

There are numerous methods presently used to code and decode digital images. Most methods require substantial amounts of computation and are not practical for real-time use. To transmit a digital image, enormous amounts of information must be handled. Conventional coding and decoding techniques often require that digital images be stored in memory and then manipulated in accordance with code and decode algorithms. In a typical 4 MHz television signal with 8 bits per pixel (BPP) of gray-level resolution with a $512 \times 512$ pixel array, approximately 2.09 million bits are required to transmit and store a single picture frame. Such a voluminous bit requirement quickly fills most modern computer storage media. With the advent of digital images and the means by which those images can be coded prior to transmission and storage, bit manipulation can be minimized. Two influential and relevant image coding schemes are presently used, Block Truncation Coding (BTC) and Vector Quantization (VQ), and have achieved great notoriety. Both conventional methods are designed to reduce the BPP rate to a level below 1.0. Furthermore, these methods also strive to maintain the quality of the original image with little image distortion.

BTC uses a partitioning scheme whereby an image is truncated into blocks of subimages. Operations are performed upon each individual block so that the end result is a binary bit stream or code representing that particular block. After each block is coded, the code is transmitted along a conventional transmission media to its target or destination. Upon arriving at the destination, the code is received by a decoder which arranges the decoded image in the same location as the original image.

BTC is fairly simple and fast. Coding is achieved by three basic steps. The first step is computing an average mean intensity value from among all the digital intensity numbers for each partitioned block. Once the mean intensity is computed, the mean is subtracted from each pixel intensity value to obtain a deviation. Deviation is representative of the number of pixels that have intensity values above and below the mean intensity and the standard deviation amount above and below the mean intensity. Thus, the third step involves transmitting a binary code corresponding to the mean intensity, pixel intensity values that are above or below that mean and standard deviation of each pixel value. These three indicia represent all the information needed for each partitioned block. Once the coded indicia are transmitted, the decoder functions merely to decode and reconstruct a decoded image from each set of indicia.

The essence of the BTC technique is the ease by which all three indicia can be represented in either a first or second moment. Each moment, commonly referred to as A or B moments, combine the essence of all three indicia by simple mathematical calculation. For a detailed explanation of calculations of first and second moments n BTC coding see D. J. Healy and Robert Mitchell, "Digital Video Band Width Compression Using Block Truncation Coding," I.E.E.E. Trans. Commun., Vol. Com-29, No. 12, pp. 1809–1817, Dec. 1981. Although BTC methods provide simple and fast coding, BPP rates are fairly high. BPP rates are recorded, on the average, to be around 1.3. Because compression ratios are generally inversely proportional to BPP rates, BTC methods prove inadequate in applications requiring high compression ratios. Using 8 bit pixel intensity values, BTC generally can only achieve compression ratios that are less than 8:1.

The second coding technique that has gained popularity along with BTC, is VQ coding. VQ coding is a relatively new image coding method that has recently attracted much attention. Like BTC, VQ partitions an image into numerous image blocks. Each image block must be mapped into an average or mean image block representative of all the blocks contained within a block cluster. See, e.g., Y. Linde, A. Buzo and R. M. Gray, "An Algorithm for Vector Analyzer Design," I.E.E.E. Trans. Common., Vol. Com-28, pp. 84–95, Jan. 1983. The clustering algorithm collects a large number of blocks drawn throughout the same sample images. Thus, each coded block is compared with code vectors in a codebook predefined in memory media. Each block is coded by transmitting a code of the closest block to it in the codebook. Decoding is fast and is achieved by a simple look-up in the codebook of the image vector having the specific target code. Since the coder and decoder employ the same codebook, only the index of the code vectors need be transmitted.

The advantage of VQ coding is its inherent ability to achieve lower BPP rates, or conversely, higher compression ratios. By coding a relatively small set of codes rather than the details of each block, VQ coding can achieve compression ratios of approximately 10:1 to 15:1.

Although compression rates are high, a major problem encountered in VQ coding is the time required to perform the block search when coding. VQ must decide upon a centroid image block for each cluster and match blocks to be placed within that cluster to the centroid image block value. This process requires a great deal of time-consuming computation. Along with the complexity and time-consumption problem, VQ coding also presents problems such as redundancy in the code vectors and low-quality image reproduction if there are an insufficient number of code vectors. Many redundant image blocks must be mapped and compared to the centroid block thereby unnecessarily adding time to the vector search operation. Furthermore, if the centroid block of a given cluster has a substantially different intensity value than the centroid block of another cluster, the transmitted code vectors corresponding to the widespread intensity values will produce low quality, low resolution decoded images.

SUMMARY OF THE INVENTION

The present invention overcomes the shortcomings of conventional coding and decoding techniques, and more particularly overcomes the problems associated with the BTC and VQ coding schemes. The present coding invention, Visual Pattern Image Coding (VPIC), comprises a method and apparatus for transmitting a digital image according to visually significant responses of the human eye. A digital image is processed by partitioning each image into a plurality of image blocks. After blocks are partitioned from the image, mean intensity value is calculated for each block, and the mean intensity value is subtracted from the actual intensity values of each block to produce a residual image block. Each residual image block is then conditioned by calculating intensity gradients, and it is concluded whether the residual image block is visually continuous (i.e., substantially uniform, or containing only high frequency spatial intensity variations), or visually discontinuous (i.e., containing a visually perceivable edge). If the block is concluded to be visually continuous, only the mean intensity value is transmitted for that block. If the block is concluded to be visually discontinuous, the intensity gradient information for the block is used to select a visual image code, corresponding to predetermined visual images, for that block, and the visual image code and mean intensity value for the block are transmitted. In addition, information regarding the intensity gradient of the block can also be transmitted if the block is concluded to be visually discontinuous.

At the receiver, the visual image code, mean intensity value and intensity gradient magnitude are decoded for each block and assembled in an orientation substantially similar to the original digital image.

The VPIC transmission scheme of the present invention combines the advantages of both the BTC and VQ methods. The present invention can achieve compression ratios of between 10:1 to 20:1. Furthermore, the invention does not require timely block search, and therefore, VPIC is inherently faster than VQ techniques and is comparable in speed to BTC. The invention also inherently removes visually redundant blocks or code vectors as they are called in VQ, while inducing very little visual distortion. The invention perceives certain visual discontinuities as being visually significant and can quickly decide which one of those should be coded. If a discontinuity is insignificant, it is not coded thereby saving significant processing time and increasing the compression ratio. The invention thus utilizes visually significant and uniquely meaningful image blocks gathered from normal human visual perception.

Mean intensity is calculated in the present invention by binary adding intensity values represented as digital numbers of each pixel contained within a block, and then dividing the binary added number by the total number of pixels in the block. After the mean intensity value is calculated, it is then subtracted from the digital number of each pixel contained within the corresponding block to produce a residual image block. In addition, gradient magnitude and orientation is calculated by quantizing the difference between digital numbers on opposing sides of each edge contained within all blocks containing a single edge, and then, assigning a polarity to each side of the edge. The differences are calculated as the property of digital numbers within each block. Gradient magnitude and orientation are used to select a visual image code for the block. The visual image code and binary mean intensity value are sent. Gradient magnitude can also be sent, however, good results are obtained when the decoder simply uses a predetermined gradient magnitude. The primary purpose of gradient magnitude and image code is to provide information to the decoder as to the difference in intensity on each side of the edge and the orientation of that intensity difference.

Once mean intensity value is obtained and that value subtracted from each digital number of pixels within the block, a residual number is produced for each pixel within a resulting residual block. Visual discontinuity location is then determined in certain blocks, wherein residual numbers within a block vary substantially above and below a zero value. The discontinuity or break occurs at the specific location where an edge is detected. It is the orientation of the edge or visual pattern that is coded and transmitted along with binary representations of mean intensity and gradient magnitude.

Included within the processing steps of the invention, along with coding, is a series of decoding steps to be incorporated within the VPIC system. VPIC decoding is much faster than coding and can decode at a reduced BPP rate in comparison to the higher BPP rate of BTC. Decoding comprises receiving a plurality digitally coded image blocks, each block including a mean intensity value and a visual pattern code. Gradient magnitude information can also be included in the received block, or can be presumed by the decoder. A uniform image block is then created having a fixed number of image pixels with each pixel having a digital number equal to the mean intensity value. A predetermined visual pattern is then located corresponding to the transmitted visual pattern code. Next, the digital number of each pixel contained within the visual pattern is multiplied by the gradient magnitude (either transmitted or predetermined) to produce a scaled visual pattern. The scaled visual pattern is then added to the uniform image block to produce a decoded image block. Finally, the decoded image blocks are assembled in proper sequence to yield a decoded image.

The decoding technique of the present invention is fairly simple in operation because it merely involves a table lookup of a small, finite number of visual patterns which correspond to transmitted visual pattern codes. The visual pattern is relevant only to the edge location and orientation, and therefore, contains a relatively small set of different combinations. This set of combinations is so small that the locating step is very fast allowing for rapid coding and decoding operations. Each visual pattern code can be rapidly decoded with proper edge location and orientation in only those blocks having a single visually significant intensity gradient. Blocks not having intensity gradients that are significant are generally not perceivable by the human eye, and therefore, are not coded/decoded under the VPIC system. Those blocks having visually insignificant gradients are merely coded as a uniform block rather than an edge block. The advantage in having uniform blocks, is that uniform blocks need not be coded and decoded according to a visual pattern code. The uniform block can be adequately represented by mean intensity value.

Visual pattern codes and gradient magnitude need not be coded and transmitted in those uniform blocks having insignificant visual gradients.

By coding uniform blocks and edge blocks differently, redundant blocks such as uniform blocks can be coded very rapidly since those uniform blocks need not carry visual pattern and gradient indicia. Thus, coding operations can be minimized and concentrated in areas where greater detail is needed, i.e., in visually significant areas. The majority of coding and decoding operations thereby involves the most important areas of the digital image: those areas where disjunctive intensities occur. The human eye is sensitive to areas where intensity varies, provided the number of intensity changes do not exceed a set amount per set distance.

In one embodiment of the present invention monochromatic images can be digitally coded and decoded. Edge blocks are extracted from those image areas having a visually significant variance between monochromatic shades. When a visually perceivable variance is discovered, that image area is partitioned as an edge block and thereby coded in accordance with a visual pattern code. Conversely, uniform blocks are derived from those image areas having visually insignificant or not visually perceivable black-white variances In another embodiment of the present invention, digital color images can be coded and decoded by using the steps used in monochromatic coding and decoding for color separated images. More particularly, coding of digital color images requires coding and decoding shades of red, green and blue colors separately and then superimposing those colors in an end result. It has been determined that pattern information is highly spatially correlated between the different color components. Thus, color image processing requires that monochromatic pattern processing be performed once on one of the color components, for example, green. Decoding proceeds simply as well. The green image is decoded exactly like a monochromatic image, and the red and blue images are decoded using the red and blue mean intensities, and the pattern information from the green image.

The present invention therefore provides a method for quickly and easily coding either monochromatic or color digital images. The invention represents a substantial improvement in computational time and complexity over conventional image decoding methods such as BTC and VQ techniques. VPIC enables real-time coding and decoding of digital images because of its inherent speed of operation and substantially small BPP rate. The speed and computational simplicity of VPIC allows modern digital computers to access and process digital images in either hardware or software in real-time and without requiring enormous amounts of memory media. These are but a few of the advantages of this invention. These and other advantages of the present invention will be further appreciated from the following drawings and the detailed description.

BRIEF DESCRIPTION OF THE DRAWINGS

FIG. 1 is a visual pattern image coding apparatus according to the present invention.

FIG. 2 is a flow diagram of the coding and decoding operations of the present invention.

FIGS. 5a–5d show various orientations of the simple visual patterns used in coding an image block according to the present invention.

FIG. 6 is a table showing required total bits, total BPP and compression ratios for various block types and algorithms of the present invention.

DESCRIPTION OF THE PREFERRED EMBODIMENTS

Figure 3A:
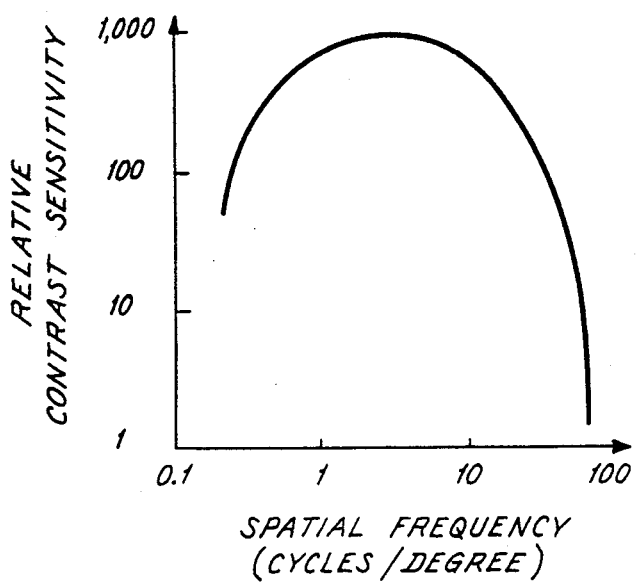
FIG. 3a is a graph showing spatial frequencies versus sensitivity of a human eye.

FIG. 1 is a block diagram of an apparatus for visual pattern image coding, transmitting, receiving and decoding, according to the present invention.

Original images are obtained by, for example, television camera 11 which can be a Panasonic type WVCD50 camera which provides an analog video signal to video digitizer 12. Digitizer 12 can be any commercially available hardware or software controlled digitizer, for example, a commercially available "framegrab" board that can be installed in microcomputers or work stations, such as a PCVISION brand board available from Imaging Technology. Digitizer 12 produces an array of pixels, with the intensity of each pixel being represented by a binary number. For example, the PCVISION digitizer produces a 512×512 pixel array with each pixel represented by an 8-bit grey scale number, resulting in 256 grey scale levels per pixel.

Alteratively, and as illustrated schematically by switch 13, digitized images can be provided directly from storage medium 14 which can be, for example, semiconductor memory, magnetic memory such a floppy disk, or optical memory such as a compact disk.

Digitized images from digitizer 13 or storage medium 14 are applied to microprocessor 16 wherein the digitized image is encoded in accordance with the steps shown schematically in FIG. 2, and in detail in the source code program included at the end of this specification.

Microprocessor 16 can be any commercially available microcomputer or work station, such as a IBM RTPC Engineering Work Station, a Sun work station, a Digital Equipment VAX work station, an Apple MacIntosh Mac II, or compatible microcomputers or work stations. In addition, microprocessor 16 can be a dedicated programmable signal processing chip, such as a TMS type signal processing integrated circuit available from Texas Instruments.

The coded video image is applied to transmitter 17 for transmission to receiver 18. Transmitter 17 and receiver 18 can be any type of well known telecommunications network, such as, for example, radio frequency, microwave, telephone, optical, as well as equivalent types of communications networks. At the receiving end of the present invention, the encoded video image is decoded by microprocessor 19 which can be any of the above-mentioned types of microprocessors, programmed according to the flow chart shown in FIG. 2, and in detail in the source code program listing included at the end of this specification.

The decoded video images then displayed on CRT display 21, and/or printed, stored, or otherwise used.

FIG. 2 illustrates a flow diagram of various steps required to code and decode a visual image according to the present invention. The original image can be either monochromatic or color and can be either analog or digital. The method of the present invention includes coding steps 22 and decoding steps 23. Each digitized incoming image is applied to block 24 where the digital image is partitioned into a plurality of sub-images or image blocks. Each image block is of predetermined size determined by the assumed viewing angle of the human eye. The viewing angle is discussed later and is shown in FIG. 2. In the preferred embodiment, the image block is 4×4 pixel locations in size for the assumed viewing angle. Thus, each image block in the preferred embodiment has 16 pixels arranged in an array within the block's boundary. However, it is important to note that the size of the image block can vary depending upon the type of images to be coded. If the images are of low resolution type, then 5×5, or 6×6, etc. pixel arrays may be preferred for the image block. In addition, blocks other than square image, blocks can be used. Any block size or shape is feasible provided the size and shape are optimally fixed as determined by the viewing geometry of the human eye. For simplicity, and for the purposes of illustration, the following discussion will be directed to image blocks fixed in 4×4 pixel array.

After image blocks are obtained, a mean block intensity calculation step 26 is be performed on each image block. Mean block intensity is computed by binary adding the digital number for each pixel contained in an image block, and by dividing the sum by the total number of pixels in the block. In the present example, the total number of pixels is fixed at 16. As shown in FIG. 2, mean block intensity is used for two purposes, 1) to derive a residual image block in step 28 and, 2) to be quantized and coded for transmission purposes in step 29. The residual image block is produced in step 27 by subtracting mean block intensity from each pixel digital value in the image block. After mean intensity is subtracted, residual pixels are produced having digital values distributed about zero. Those residual pixels having intensity values greater than zero are represented with positive polarity, and those pixels having intensity values less than zero are represented by negative polarity. As explained below in more detail with reference to FIG. 5, the positive and negative polarity patterns define various configurations corresponding to the location and orientation of visual discontinuities within each image block. The number of different patterns is fairly small, for example, four or eight in number. The entire set of visual patterns are stored in library 30 of computer memory and are used to match against each residual image block in matching step 31. Visual pattern matching can be performed rapidly since the number of predetermined visual patterns stored in library 30 is fairly small.

Before determining whether a pattern stored in memory 30 matches the residual image block under analysis, matching step 31 performs image gradient calculations on the residual image block to determine whether the residual image block contains any visually significant discontinuities, or edges. If matching block 31 determines that the residual image block under analysis contains no visually significant discontinuities, the residual image block is concluded to be a uniform image block, and only mean block intensity is transmitted for that block. If, on the other hand, matching step 31 determines that the residual image block contains a visually significant discontinuity, the image gradient of the residual image block is used to select the proper pattern from visual pattern library 30. Then, a code corresponding to the matching visual pattern is transmitted along with the mean block intensity.

In addition, matching block 31 can calculate a gradient magnitude for the residual image block, which is an indication of the difference in intensity on either side of the visually significant discontinuity contained within the residual image block. If desired, gradient magnitude can also be, transmitted with mean block intensity and visual pattern code.

Once the coded images are received at their final destination, they are decoded by decoding steps 23. As shown in FIG. 2, decoding steps 23 comprise visual pattern look-up step 33 which locates the visual pattern from the visual pattern library 34 using the received visual pattern code. Gradient magnitude, if transmitted, and the selected visual pattern are multiplied to produce a scaled visual pattern. The scaled pattern is then added to a uniform image block which consists of pixel values equal to received quantized mean block intensity. The sum of the scaled pattern and uniform image block represents the decoded version of the original image block. Each decoded image block is then assembled in proper sequence in block 36 to yield a decoded image that closely visually approximates the incoming image.

An important aspect of the present invention is the ability to distinguish between visually significant and visually insignificant image blocks. The human eye, being an efficient image processing tool, can be analyzed as a processing center that processes images into sub-images or blocks having visually significant indica. Human eyes have photoreceptive cells in the retina which convert incoming light into electrical signals that are relayed and processed by the post-retinal ganglion cells and later, in the visual cortex. Ganglion and cortical cells have receptive fields that respond to the spatial structure of incoming stimuli. Certain receptive fields are not sensitive to the absolute light intensity but they are quite sensitive to the difference of the light intensity following any excitatory and inhibitory regions. These receptive fields have different shapes and are sensitive to stimuli of specific shapes and sizes. Accordingly, cortical cells have simple cells which appear to be sensitive to bar or edge-like structures. See, L. Kaufman, *Perception*, Oxford University Press, pp 135–146 1979.

The composition of images into low frequency blocks or blocks containing a single visual pattern (edge) suggest that an image can be adequately represented by localized block description of smooth (continuous) regions and disjunctive (edge) regions. Recent work in this area has led researchers to conclude that retinal cells of human eyes are sensitive to a spatial frequency range shown in FIG. 3a. See, e.g., L. Kaufman, *Perception*, Oxford University Press, pp 135–146 1979; N. D. Levine, *Vision in Man and Machine*, McGraw-Hill, chapters 2 and 6, 1985. As demonstrated in FIG. 3a, normal eyes are sensitive to the spatial frequency in the range of 1–10 cycles/degree. Thus, the human observer can optimally detect between 1 to 10 edges or cycles per viewing degree. In addition, as the spatial frequency or number of edges per degrees increases, the digital response time of the human observer increased accordingly. As shown in FIG. 3b, if there are numerous visual discontinuities visible in a given viewing angle, response time can be fairly slow. For example, if the viewing angle is one degree and there are five discontinuities or cycles shown in that viewing angle, then response time is approximately 250 milliseconds.

Figure 3B:
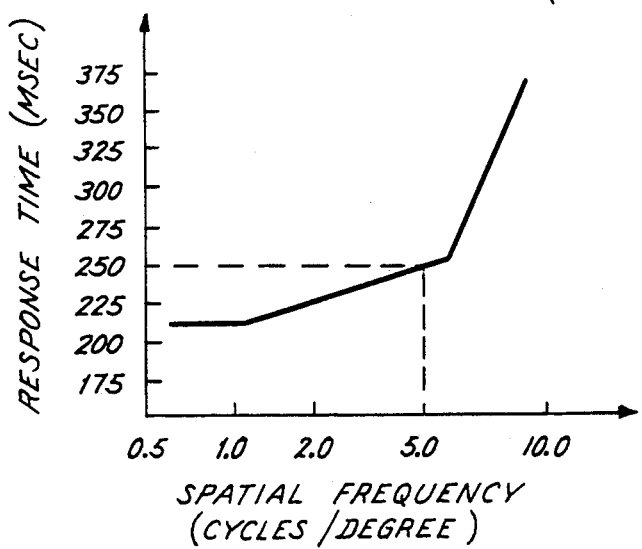
FIG. 3b is a graph showing spatial frequencies versus response time of a human eye.

The spatial frequency response curve and latency response curve of FIG. 3a and 3b respectively, combine to form the spatial frequency constraint that is exploited by this invention. Image blocks are sized in accordance with the spatial frequency constraint. Due to the limitations of visual frequency response, a coding algorithm need only code image structures within a certain spatial frequency range. Anything outside that range can be omitted without causing visual distortion. In other words, only visually perceivable or significant edge and contrast information need be coded. Since the overall passband on the receptive field of the normal human eye is in a range of 1–10 cycles/degree, image frequencies exceeding 10 cycles/degree contribute very little to perception due to the lower frequency response and greater increased latency. The present invention functions to constrain the pattern size for the image block based upon this overall passband characteristic of the receptive fields in conjunction with a reasonable viewing geometry. The present invention uses a coding scheme whereby an image is broken into either uniform blocks or edge blocks. Uniform blocks are of low spatial frequency or high spatial frequency and are visually continuous while edge blocks are visually discontinuous. Uniform blocks can be represented by quantized mean block intensity. Conversely, edge blocks require visual pattern code, gradient magnitude, and quantized mean block intensity for full representation of the edge location, orientation and intensity contrast on opposite sides of the discontinuity.

Figure 4:
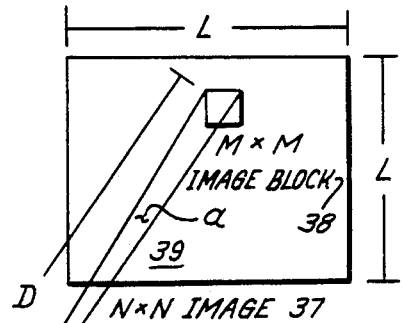
FIG. 4 is a diagram showing visually significant image block derived from optimal viewing angle of a human eye.

The strategy adopted in the present invention is that the size of the image block is chosen to contain at most one visible discontinuity. This constraint can be supported by reference to FIG. 4. Assume that image 37 to be coded is of $N \times N$ pixel geometry and that image block dimensions are $M \times M$ pixels. If monitor 39 is used to display $N \times N$ pixels, and the size of monitor 39 is $L \times L$ cm, and D is the viewing distance between viewer 41 and monitor in cm, then if D is much larger than L, the viewing angle alpha ($\alpha$) subtending an image block is approximately:

$$\alpha \approx 180 \tan^{-1}\left(\frac{LM}{ND}\right).$$

For typical values where N=512, M=4, L=21.5 cm and D=200 cm, the viewing angle $\alpha$ is approximately 0.15°. Referring back to FIG. 3a, if the visual passband is maximized between 3–6 cycles/degree, then approximately 1 cycle or edge can occur within the 0.15 degree view angle. Under a standard viewing distance of 200 cm., 0.15° viewing angle generally corresponds to a 4×4 image block array. Thus the image block may be advantageously fixed at a 4×4 pixel size. Although this example results in 4×4 pixel blocks, other block sizes are feasible provided they satisfy the necessary conditions imposed by the viewing geometry. Preferably, 4×4 pixel image blocks are used, which serve to demonstrate the power of the decoding algorithm, and which also simplifies pattern design. It should be observed, however, that the range of frequencies processed biologically is divided into several different channels: this suggests that multi-scale modifications of VPIC can be designed that define a set of spatial frequency constraints derived from the various passbands, and that operate over a hierarchy of resolutions. At each scale of processing, the size of the image blocks or visual patterns used can be varied without changing the number of patterns, by varying the resolution of coded blocks.

Since the predetermined visual patterns are used to represent natural images as perceived by a human observer, the selected visual patterns must be visually significant and give a quality representation to the original image while satisfying the visual constraints described above. This is accomplished, according to the present invention, by using small patterns or image blocks of such a size that edges contained in one or more of these blocks activate cortical neurons. Also, image blocks should not be repetitive.

As mentioned earlier, uniform blocks are coded using a single indicia (i.e., mean block intensity) so as to reduce the amount of coding needed for substantially redundant patterns associated with uniform image blocks. It is the edge image block that receives additional coding operations since accurate discontinuity location is crucial for achieving high definition image processing.

In choosing the predetermined visual patterns stored in visual pattern libraries 30 and 34 (FIG. 2), the image to be coded is first denoted as an array $I = I_{i,j}$ that is a union of disjoint 4×4 image blocks, each of the form:

$$b_{i,j} = [I_{n,m}: 4i \leq n \leq 4i+3, 4j \leq m \leq 4j+3].$$

Prior to assigning patterns to image blocks (step 31, FIG. 2), the mean intensities of the image blocks are coded separately (blocks 26 and 29, FIG. 2), and the mean intensity is subtracted from the individual pixel values of the image block (step 27, FIG. 2), to produce a residual image block (step 28, FIG. 2), having mean zero mean intensity. This allows for the design of predetermined visual patterns independent of the average intensity differences that occur between image blocks, hence reducing the number of required predetermined patterns.

In determining visual patterns which accurately represent visually discontinuous image blocks, a measure of the intensity variation, and specifically the edge or discontinuity content of the image I, is the discrete gradient $\nabla I = (\Delta_x I, \Delta_y I)$, where the directional derivative approximations $\Delta_x I = \Delta_x b_{i,j}$ and $\Delta_y I = \Delta_y b_{i,j}$ are computed as oriented differences between weighted averages of contiguous average neighborhoods lying within each image block. Computationally convenient definitions of the directional variations within each image block are:

$$\Delta_x b_{i,j} = AVE[I_{n,m}: 4i + 2 \leq n \leq 4i + 3, 4j \leq m \leq 4j + 3] -$$
$$AVE[I_{n,m}: 4i \leq n \leq 4i + 1, 4j \leq m \leq 4j + 3]$$

$$\Delta_y b_{i,j} = AVE[I_{n,m}: 4i \leq n \leq 4i + 3, 4j + 2 \leq m \leq 4j + 3] -$$
$$AVE[I_{n,m}: 4i \leq n \leq 4i + 3, 4j \leq m \leq 4j + 1].$$

The gradient magnitude (a measure of the intensity change from one side of the edge to the other), and the gradient orientation (a measure of the angle of the edge within the image block) within each image block are given respectively by:

$$|\nabla b|_{i,j} = \sqrt{(\Delta_x b_{i,j})^2 + (\Delta_y b_{i,j})^2}$$

and;

$$\angle \nabla b_{i,j} = \tan^{-1}\left(\frac{\Delta_y b_{i,j}}{\Delta_x b_{i,j}}\right)$$

The computed gradient magnitude and gradient orientation correspond to the contrast and orientation of the intensity change occurring within the image block $b_{i,j}$. These quantities have continuous ranges that, according to the present invention, are quantized to simplify coding for transmission. Since small image blocks are used, gradient orientation is quantized in 45° increments, yielding four basic edge patterns with respective orientations of 90°, 45°, 0° and −45°. The remaining orientations, 135°, 180°, 225°, and 270°, have the same orientation as the four basic edge patterns, but have opposite contrast. These are coded, according to the present invention, by separately coding and transmitting a polarity bit along with the pattern code.

It should be noted that the arctangent function (a computationally inefficient function) is not actually used to calculate gradient orientation. Rather, since the gradient orientations are quantized, constants can be stored for simple comparison with the directional variations.

FIGS. 5a-5d illustrate possible combinations of visual patterns used for detecting a single discontinuity within each image block. There are 14 visual patterns that depict a set of possible edge locations and orientations within a 4×4 pixel array or image block. The break between positive and negative polarity represent the location and orientation of the edge. In a boundary or edge between a lighter and darker disjunctive region, positive and negative polarity represent that disjunctive region. The visual patterns shown in FIGS. 5a-5d may be represented by four basic edge patterns with respective orientation of 90°, 45°, 0° and −45°. However, any number of patterns may be used without departing from the scope of the invention. Choosing a set of patterns (for example, 4 patterns or all 14 patterns) allows the predetermined image blocks to be centered at a variety of distances from the edge at any orientation. Using only $P_2$, $P_6$, $P_9$ and $P_{12}$ allows for a smaller BPP ratio and conversely, greater compression ratio than when all visual patterns $P_1$-$P_{14}$ are used with little degradation in image quality. As demonstrated below, a surprisingly small number of patterns selected from FIG. 5 can code images with remarkable quality.

In one embodiment of the invention, transmitted along with coded representations of the matched visual pattern is gradient magnitude. Gradient magnitude is a quantized value assigned to each pixel location in accordance with binary coded representation of that quantized value. If the intensity difference between difference is rather substantial, i.e., the difference between white and black, then the gradient magnitude will be quite large. However, if the difference is small, such as that found between different shades of gray, blue, red or green, then gradient magnitude is fairly small. Along with magnitude, gradient polarity is also transmitted digitally to indicate which side of the edge has the higher gradient intensity value. As will be shown later, the gradient intensity range can be limited without severely limiting intensity contrast of the decoded image.

In addition, gradient magnitude need not be transmitted at all, and the decoder can use a predetermined gradient magnitude without significant degradation of image quality.

It has been observed that image blocks having a zero or very low gradient magnitude are usual, and the frequency of gradient magnitude decreases quickly beyond some high value. In the present invention, two thresholds are set that constrain the range of image gradient magnitudes to be coded. The low threshold, $|I|_{min}$, represents the minimum perceivable gradient magnitude that can occur in an image. As mentioned above, if the calculated gradient magnitude for a particular residual image block is less than the low threshold, the image is concluded to be a uniform block, and only mean intensity for that block is transmitted, and edge orientation need not be computed. Thus, $|I|_{min}$, effectively determines the number of edge blocks present in the image, the remaining image blocks being coded as uniform patterns. Although there is considerable flexibility in the choice of the minimum gradient threshold, it is not a function of the image to be coded. Moreover, the speed of the coding algorithm is independent of the minimum threshold.

A second threshold, $|I|_{max}$, denotes the maximum gradient magnitude that is coded distinctly, with all gradient values above this being truncated to the value, $|I|_{max}$. In selecting the second threshold, it is to be noted that large gradient values occur infrequently and that the human eye is not very sensitive to the magnitude of edge gradients. Of much greater visual significance is the simple presence of edges, and the average image intensities near the edges. The difference between the high and low thresholds for gradient magnitude determine the range of gradient magnitudes that are actually coded.

It should be emphasized that gradient magnitude need not be coded and transmitted, and that a predetermined gradient magnitude can be presumed by the decoding portion of the invention without significant degradation of image quality.

Referring to the Table in FIG. 6, total bits required to code uniform block and edge block using the two embodiments of the present invention (denoted algorithm I and algorithm II) are shown. Four basic patterns $P_2$, $P_6$, $P_9$ and $P_{12}$ (FIG. 5) are used in algorithm I, while 8 basic patterns $P_1$, $P_3$, $_5$, $P_6$, $P_8$, $P_{10}$, $P_{12}$ and $P_{13}$ (FIG. 5) are used algorithm II. In algorithm I, gradient magnitude minimum and maximum are not transmitted and are set at 30 (out of 256), whereas in algorithm II, gradient magnitude minimum and maximum are 10 and 90 (out of 256). Thus, the number of gradient magnitudes (M) for algorithm I is 1, and for algorithm II is 8 (the gradient range being quantized in equal increments of 10). Having a lower threshold gradient magnitude of 10, shown in algorithm II rather than 30 in algorithm I, means that minor differences in edge details can be coded in algorithm II in areas where contrast changes are significant. Conversely, larger gradient magnitude maximums will smooth very fine edge details. Since M in algorithm I is 1, the bit value representation, or gradient index, is not required in algorithm I. However, the bit value representation for M=8 in algorithm II is 3 since 3 bits are required represent numbers 1-8. Thus, an additional 3 bits are required for the gradient index of algorithm II.

Also shown in FIG. 6 is block type indicator bit which is a single bit to indicate whether or not the block is a uniform block or an edge block. Mean intensity represents the number of bits required to characterize mean block intensity. If the block is uniform, higher resolution of mean intensity can be achieved by assigning more bits to uniform blocks than to edge blocks, if desired. The number of bits shown in FIG. 6 which represent mean intensity are found to produce adequate coverage of all possible mean intensity values. However, these numbers, as with all of the bit numbers provided in FIG. 6, are merely illustrative, and should not be considered to limit the invention. The number of bits assigned to each indicia can be changed substantially depending upon the application and desired outcome. Also shown in FIG. 6, is a pattern index representing the number of bits needed to characterize the various orientations of the predetermined visual patterns. Since algorithm I uses only four basic patterns, $P_2$, $P_6$, $P_9$ and $P_{12}$, only two bits are needed to represent all four combinations. However, three bits are needed to represent the 8 basic patterns ($P_1$, $P_3$, $P_5$, $P_6$, $P_8$, $P_{10}$, $P_{12}$ and $P_{13}$) of algorithm II. The end result or total for all of the bits needed to convey adequate representation of each image block is shown in FIG. 6, and is dependent upon the application (i.e., whether or not algorithm I or algorithm II is chosen and whether or not the block type is uniform or edge). Note that in all cases, compression ratios exceed 10—best-case estimate for VQ coding and much better than BTC methods. In addition, the present invention is two orders of magnitude faster than VQ coding.

Image decoding is very simple using the present invention. The coded image blocks are represented either as uniform blocks or as edge blocks, the decoding of the present invention can be easily achieved through one of two simple methods. Edge block decoding only requires simple table look-ups, a single multiplication, and a single addition. Thus, image decoding is no more complex than VQ. Moreover, uniform blocks can be more easily decoded than either VQ or BTC since decoding of uniform blocks according to the present invention avoids redundancy inherent in BTC and VQ schemes.

At very high compression ratios, the predominant distortion that occurs in the present invention are block effects arising from coarse quantization of the average intensities in uniform (non-edge) blocks. Block effects are manifested as visual false contours occurring between blocks of similar average gray level. To correct this problem, simple block smoothing algorithms may be applied to the mean block intensity, without degrading the image details (edges). An efficient smoothing technique is to apply a smoothing filter to the mean intensity before the edges are superimposed. It is found that a simple 3×1 moving average filter applied along each dimension of the mean intensity subimage prior to adding the edge block, decreases the visual distortion. The moving average filter is simply the weighted average of three adjacent points. TABLE I shows the computation complexity of a 4×4 decoding and smoothing operation when both equal weight and nonequal weights are used:

TABLE I

|  | Equal Weights | Non-Equal Weights |
|---|---|---|
| Pattern addition | 16 add. | 16 add. |
| Post-filtering | 96 add. 32 mul. | 320 add. |
| Operation/Pixel | 7 add., 2 mul. | 21 add. |

Figure 7A:
FIGS. 7a, 7b, 8a, 8b, 8c and 9a, 9b, 9c show comparisons between original images and those original images coded and then decoded using algorithm I and algorithm II of the present invention.
Figure 7B:
Figure 7C:
Figure 8A:
Figure 8B:
Figure 8C:
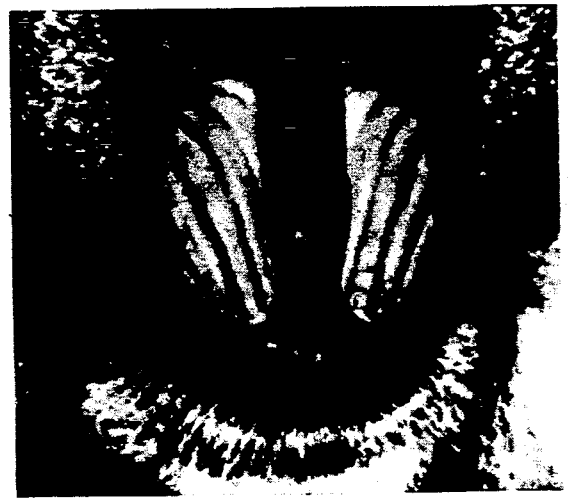
Figure 9A:
Figure 9B:
Figure 9C:

Simulation results of the present invention are shown in FIGS. 7, 8 and 9. Algorithms I and II described in coding and equal weights described in decoding are used on "Lena", "Mandrill" and "Pepper" images to provide examples of the present invention in operation. FIG. 7a is the original Lena image, FIG. 7b is the coded Lena using algorithm I of the present invention, and FIG. 7c is the coded Lena image using algorithm II of the present invention. Shown in FIG. 8a is the original Mandrill image, FIG. 8b is the coded Mandrill using algorithm I, and FIG. 8c is the coded Mandrill using algorithm II. Finally, FIG. 9a is the original Pepper image, FIG. 9b is the coded Pepper using algorithm I, and FIG 9c is the coded Pepper image using algorithm II. The following TABLE II illustrates the simulation results for all three images:

TABLE II

| Image | Lena | | Mandrill | | Pepper | |
|---|---|---|---|---|---|---|
| Algorithm | I | II | I | II | I | II |
| Uniform Blocks | 14890 | 12413 | 12496 | 69311 | 50361 | 3061 |
| Edge Blocks | 1494 | 3971 | 3888 | 9453 | 1321 | 3323 |
| BPP | 0.38 | 0.49 | 0.39 | 0.56 | 0.38 | 0.48 |
| Compression | 21.06 | 16.44 | 20.61 | 13.89 | 21.09 | 16.74 |

An alternative preferred embodiment of the present invention involves digital coding of color images. Perception in color by the three elementary colors, red, green and blue, is commonly known as trichromacy. Any color can be matched by a proper linear combination of these three colors. The luminance of the color mixture is equal to the sum of luminance of three individuals, red, green and blue (RGB) colors. Consequently, a straightforward way of color representation is the RGB representation that is most dominant in modern color sensing devices. In the RGB representation, a color image is composed of three different single color images: red, green and blue components. The equally weighted sum of the RGB images yield the full color image. Moreover, in color television broadcasting, YIQ color representation can be made according to NTSC standards, wherein YIQ relates to RGB linearly by:

$$Y = 0.299 R + 0.587 G + 0.114 B$$

$$I = 0.596 R - 0.274 G - 0.322 B$$

$$Q = 0.211 R - 0.523 G + 0.312 B$$

The Y signal is called the luminance signal that appears white or no color. The I and Q signals are called the hue and saturation signals.

It has been shown experimentally that chromatic information in the different color components using either the RGB or YIQ representation is highly spatially correlated. Thus, a single visual pattern can be used to code a block taken at the same resolution and from the same point in the image for each of the three color components. In addition, pattern gradient magnitudes can still be coarsely quantized, and used to represent the pattern gradient of all three color components.

In RGB images, the green image component is used for the extraction of pattern information, since the human eye is most sensitive to this component. The present invention is applied to the green color separated image to obtain the mean intensities and edge pattern of each green image block. The red and blue color separated components are simply assessed for mean intensity, but no pattern information is extracted or coded from these. Decoding proceeds simply as well. The green image is decoded as described above for the monochromatic image, and the red and blue images are decoded using the transmitted red and blue mean intensities, and the edge patterns obtained from the green image. Thus, considerable savings in the BPP rate and in the coding complexity are achieved.

Similarly, in YIQ images, the luminance is used to obtain mean luminance intensities and edge patterns for each luminance image block, and the hue and saturation signals are assessed only to determine the mean image block intensities. The luminance image is decoded using the transmitted mean intensity and pattern information for the luminance blocks, and the hue and saturation images are decoded using the transmitted hue and saturation mean intensities, and the edge patterns obtained from the luminance image.

The foregoing description of the invention has been directed to a particular preferred and alternative embodiments of the present invention. It will be apparent, however, to those skilled in the art that modifications and changes in method may be made without departing from the scope and spirit of the invention. For example, instead of using 4×4 pixel arrays, any size of pixel arrays may be used providing the size of the array is of satisfactory viewing geometry as dictated by the physiological visual response curve described earlier. Also, the size of visual pattern library can be varied depending upon the number of visual patterns necessary for the given application. It is preferred, however, that four is the minimum number of visual pattern. Still further, it is important to note that either monochromatic or color images can be coded and decoded without deviating from the invention. Thereefore,it is the applicants' intention in the following claims to cover all equivalent modifications and variations, including those described herein, which fall within the true spirit and scope of the invention.

The following are source code listings, written in Clanguage, for: the program used to generate the library or codebook of visual patterns; the algorithm I coding program, including the edge subroutine; the algorithm I decoding program; the algorithm II coding program (also calling the edge subroutine); and the algorithm II decoding program. Copyright, 1990, The University of Texas System.

```
/*
File: book.c

This program generates all-visual patterns
    used in the VPIC coding and decoding programs.
    The basic visual patterns are defined in "edge.h"
    and the gradient information is then incorporated.

gMin, gMax: minimum and maximum gradient values;
    MEL: number of gradients for each edge.
*/ include <stdio.h>
include <math.h>
# include "edge.h"

define  BlkSize 4 int     pattern[BlkSize][BlkSize];
int     book[256][16];              /*codebook*/ int gMin, gMax, dg, g;              /*gradient values*/
int aMin, aMax, da, a;              /*intensity shift*/
int     MEL, MU;

FILE  *fopen(), *fd;

main(argc, argv) int argc; char *argv[]; {
```

```
  int i,j;
  int i1, j1;
  int shade;
  int index=0;              /*index to codebook */
  int nn=BlkSize*BlkSize;
  int gMid;

/* read data */
 fd = fopen("code.dat", "r");
 fscanf(fd,"%d", &gMin);
 fscanf(fd,"%d", &gMax);
 fscanf(fd,"%d", &MEL);
 dg = (gMax-gMin)/(MEL*2);            /*gradient increment*/
 printf("minimum gradient gMin %d\n", gMin);
 printf("maximum gradient gMax %d\n", gMax);
 printf("MEL %d\n", MEL);
 fclose(fd);

gMid = (gMax+gMin)/2;

/* horizontal edges */
 g= gMin;
 for (i1=index; i1<index+MEL; i1++, g+=dg){
   SetPattern(pattern, e0_1, g);
   Copy(pattern, book[i1], nn);
   }
 index+= MEL;

/* vertical edges*/
 g= gMin;
 for (i1=index; i1<index+MEL; i1++, g+=dg){
   SetPattern(pattern, e90_1, g);
   Copy(pattern, book[i1], nn);
   }
 index+= MEL;

/* 45 degree edges*/
 g= gMin;
 for (i1=index; i1<index+MEL; i1++, g+=dg){
   SetPattern(pattern, e45_1, g);
   Copy(pattern, book[i1], nn);
   }
 index+= MEL;

/*
 g= gMin;
 for (i1=index; i1<index+MEL; i1++, g+=dg){
   SetPattern(pattern, e45_2, g);
   Copy(pattern, book[i1], nn);
```

```
        }
    index+= MEL;
*/
/* 135 degree edges*/
  g= gMin;
  for (i1=index; i1<index+MEL; i1++, g+=dg){
    SetPattern(pattern, e135_1, g);
    Copy(pattern, book[i1], nn);
    }
  index+= MEL;

/*
  g= gMin;
  for (i1=index; i1<index+MEL; i1++, g+=dg){
    SetPattern(pattern, e135_2, g);
    Copy(pattern, book[i1], nn);
    }
  index+= MEL;
*/

/* uniform */
  for (i1=index; i1<256; i1++) {
   for (j1=0;j1<16;j1++) {
    book[i1][j1]=0.0;
    }
  }

/* remove mean for each code vector */ for (i1=0;i1<256; i1++) {
    RemoveMean(book[i1], 16);
    }
  fd = fopen("CodeBook", "w");
  fwrite(book, 1, sizeof(book), fd);
  fclose(fd);
  }

SetPattern(pattern, basicPattern, g)
  int pattern[BlkSize][BlkSize];
  int basicPattern[BlkSize][BlkSize];
  int g; {
  register i, j;
  for (i=0;i<BlkSize;i++) {
    for (j=0;j<BlkSize;j++) {
        pattern[i][j]=g*basicPattern[i][j];
        }
    }
  }
```

```
Copy(a, b, n) float *a, *b; int n; {
  while(n--) *b++= *a++;
}

RemoveMean(a, n) int *a; int n; {
 int mean;
 register i;
 mean=0;
 for (i=0;i<n;i++) {
  mean+= a[i];
 } mean /=n;
 for (i=0;i<n;i++) {
  a[i] -= mean;
 }
}
/*
  Basic Visual Patterns.
*/

/* horizontal */
int e0_1[4][4]= {
        { 1, 1, 1, 1},
        { 1, 1, 1, 1},
        {-1,-1,-1,-1},
        {-1,-1,-1,-1}};

/* vertical edge*/
int e90_1[4][4]={
        {1, 1,-1,-1},
        {1, 1,-1,-1},
        {1, 1,-1,-1},
        {1, 1,-1,-1}};

/* 45 degree edge */
int e45_1[4][4]={
        {1, 1, 1, 1},
        {1, 1, 1,-1},
        {1, 1,-1,-1},
        {1,-1,-1,-1}};

/* 135 degree edge */
int e135_1[4][4]={
        {1,-1,-1,-1},
        {1, 1,-1,-1},
        {1, 1, 1,-1},
        {1, 1, 1, 1}};
```

```
/*
  File: edge.h

8 Basic Visual Patterns.
*/
/* horizontal */
int e0_1[4][4]= {
       { 1, 1, 1, 1},
       {-1,-1,-1,-1},
       {-1,-1,-1,-1},
       {-1,-1,-1,-1}};
int e0_2[4][4]= {
       { 1, 1, 1, 1},
       { 1, 1, 1, 1},
       { 1, 1, 1, 1},
       {-1,-1,-1,-1}};

/* vertical edges*/
int e90_1[4][4]={
       {1,-1,-1,-1},
       {1,-1,-1,-1},
       {1,-1,-1,-1},
       {1,-1,-1,-1}};
int e90_2[4][4]={
       {1, 1, 1,-1},
       {1, 1, 1,-1},
       {1, 1, 1,-1},
       {1, 1, 1,-1}};

/* 45 degree edges */
int e45_1[4][4]={
       { 1, 1, 1,-1},
       { 1, 1,-1,-1},
       { 1,-1,-1,-1},
       {-1,-1,-1,-1}};
int e45_2[4][4]={
       {1, 1, 1, 1},
       {1, 1, 1,-1},
       {1, 1,-1,-1},
       {1,-1,-1,-1}};
/* 135 degree edges */
int e135_1[4][4]={
       {-1,-1,-1,-1},
       { 1,-1,-1,-1},
       { 1, 1,-1,-1},
       { 1, 1, 1,-1}};
int e135_2[4][4]={
       {1,-1,-1,-1},
       {1, 1,-1,-1},
       {1, 1, 1,-1},
       {1, 1, 1, 1}};
```

```
/*
        Visual Pattern Coding Program

This program implements VPIC coding program.
        Only 4 basic visual patterns as defined in "edge.h"
        are used to code the images. The other visual patterns
        with the gradient information are generated and stored
        in the codebook by "book.c". The program uses integer
        arithmetic and it also uses one byte to simulate one
        bit. At the end of the program, the total number of
        bits used and other relevant information are given.

The data file "code.dat" defines the minimum and
        maximum gradients, number of the gradient magnitudes
        etc.
*/ include <stdio.h>
include <math.h> define BlkSize 4
int ImgSize;

char *Image;
int    CodeBook[256][16];
int    gThresh;
int    MEL, MU;           /*number of quantization levels*/
int ne0, ne45, ne135, ne90;
int nUniform=0;           /*number of uniform blocks*/
int nNonUniform=0;        /*number of non uniform blocks*/
unsigned mask4,uniformMask, nonUniformMask;
int    gDist[20];         /*gradient distribution*/ int Buffer[512*512*3>>4];  /* image buffer*/ main(argc, argv) int argc; char *argv[]; { register int i, j, i1, j1;
  register int *pBuffer= Buffer;
  register int *pbi;
  register char *pj;
  char *pi;
  int mean;
  int polarity;
  int index;
  FILE *fpoen(), *fd;
  long time(), start, finish;
  int atoi();
```

```c
if (argc!=4){
    printf("Supply parameters!\n");
    return;
}

ImgSize = atoi(argv[3]);
Image = (char*)malloc(ImgSize*ImgSize*sizeof(char));
/* read image */
fd = fopen(argv[1], "r");
fread(Image, 1, ImgSize*ImgSize*sizeof(char), fd);
fclose(fd);
/* read codebook */
fd = fopen("CodeBook", "r");
fread(CodeBook, 1, sizeof(CodeBook), fd);
fclose(fd);

/* read */
fd = fopen("code.dat", "r");
fscanf(fd,"%d", &MEL);
fscanf(fd,"%d", &MEL);
fscanf(fd,"%d", &MEL);
fscanf(fd,"%x", &uniformMask);
fscanf(fd,"%x", &nonUniformMask);
fscanf(fd,"%d", &gThresh);
printf("MEL %d\n", MEL);
printf("gThresh %d\n", gThresh);
fclose(fd);
for (i=0;i<20;i++) gDist[i]=0;

/* open output file */
fd = fopen(argv[2], "w");
/* for each block, remove the mean and find the index to the template*/
ne0=ne90=ne45=ne135;
/* coding*/
printf("Coding now...\n");
start = time((long*)0);
for (i=0;i<ImgSize;i+=BlkSize) {
    if (i%128 == 0) {
        printf("i = %d\n", i);
    }
    for (j=0;j<ImgSize;j+=BlkSize) {

VPIC(Image+i*ImgSize+j, &mean, &index, &polarity);
        if (index%MEL==0) {      /* uniform block*/
            nUniform++;
            mean = mean & uniformMask;
        }
```

```
        else {
          nNonUniform++;
          mean = mean & nonUniformMask;
          }
/*
        write to buffer
*/
        *pBuffer++ = polarity;
        *pBuffer++ = mean;
        *pBuffer++ = index;
        }
    }
    finish = time((long*)0);
    printf("Codding Time:  \t%4d Seconds\n", finish-start);
    printf("edges detected:\n");
    printf("\thorizontal\tvertical\t45 degree\t135degree\n");
    printf("\t%d\t\t%d\t\t%d\t\t%d\n", ne0, ne90, ne45, ne135);
    for (i=0;i<20;i++) { printf("%4d ", gDist[i]); }
    printf("\n");
    printf("%d uniform blocks\n",nUniform);
    printf("%d nonuniform blocks\n",nNonUniform);
/* output file */ fwrite(Buffer, 1, sizeof(Buffer), fd);
    fclose(fd);

}

VPIC(block, mean, index, polarity)
  char *block; int *mean, *index, *polarity; {
  int angle;
  int g;
  register int offset;
  int type;

/*
  Call EdgeLine to find the gradient and oritation
  of the block.
*/
  *polarity= 0;
  Edge(block, 0, &g, &angle, polarity, mean);

if (g>=gThresh) {
       offset=1;
       }
  else {
       offset=0;
       }
```

```
gDist[offset]++;
switch(angle) {
 case 0:
     *index = offset;
     ne0++;              /* horizontal edge*/
     break;
 case 90:            /* 90 degree */
     *index= MEL + offset;
     ne90++;
     break;
 case 45:            /*45 degree edge*/
     *index = 2*MEL + offset;
     ne45++;
     break;
 case 135:           /*135 degree edge*/
     *index = 3*MEL + offset;
     ne135++;
     break;
}
return;
}
```

2
60
2
0F8
0E0
31

```
/*
  File: e.c
      Edge detection.  Each of the following function detects
      one kind of edges.  The maximum gradient is returned.
      This program uses integer arithmetic.
      It also returns the mean intensity.

Edge Detection uses new patterns.
      The gradient g is always positive.
      if polarity=0, polarity is not reversed;
      if polarity=1, polarity is reversed.
*/
extern int ImgSize;
# define BlkSize 4
# define c1 0.309    /* tan(pi/8) */
# define c2 2.572    /* tan(3*pi/8)*/
# include <math.h>

Edge(b, thresh, g, angle, polarity, mean)
  char *b; int thresh, *g, *angle, *polarity, *mean; {
```

```
register int upLeft, upRight;
register int lowLeft, lowRight;
register char *pb;
int    dx, dy;      /*gradient in x and y direction*/
double t, temp;
int maxMean;

pb= (char *)b;
upLeft= *pb++;
upLeft+= *pb++;
upRight= *pb++;
upRight+= *pb++;
pb+= ImgSize;
upRight+= *--pb;
upRight+= *--pb;
upLeft+= *--pb;
upLeft+= *--pb;
pb+= ImgSize;
lowLeft= *pb++;
lowLeft+= *pb++;
lowRight= *pb++;
lowRight+= *pb++;
pb+= ImgSize;
lowRight+= *--pb;
lowRight+= *--pb;
lowLeft+= *--pb;
lowLeft+= *--pb;

*mean = (upLeft+upRight+lowLeft+lowRight)>>4;

dx = (upRight+lowRight-upLeft-lowLeft)>>3;
dy = (upLeft+upRight-lowLeft-lowRight)>>3;

*polarity=0;
*g = sqrt((double)dx*dx + (double)dy*dy);
if (*g<thresh) return;

if (dy==0) {
      *angle = 90;
      if (dx>0) *polarity=1;
      return;
      }
else {
      temp = (double)dx/(double)dy;
      }

/* lowLeft used as a temporarily vairable */
```

```
t = fabs(temp);
if (t<c1) {
    *angle = 0;
    if (dy<0) *polarity=1;
    }
else if (t<c2 && temp<=0.0) {  /* 45 degree*/
    *angle = 45;
    if (dx>0) {
      *polarity=1;
      }
    return;
        }
    else if (t<c2 && temp>=0.0) {   /* 135 degree*/
        *angle = 135;
        if (dx>0) *polarity=1;
        return;
        }
    else {
        *angle = 90;
        if (dx>0) *polarity = 1;
        }
    return;
    }

/*
        VPIC Decoding Program.

*/ include <stdio.h>
include <math.h> int ImgSize;
int ImgSize2;

define Image(i,j) (*(image+(i)*ImgSize+(j)))
#define IndexMap(i,j) (*(indexMap+(i)*ImgSize2+(j)))
#define MeanMap(i,j) (*(meanMap+(i)*ImgSize2+(j)))
#define PMap(i,j) (*(pMap+(i)*ImgSize2+(j)))

define BlkSize 4 char *image;
int *pMap, *meanMap, *indexMap;
int    CodeBook[256][16];
```

```
  int   MEL;
  int   dmean=2;   /*mean compensate*/ main(argc, argv) int argc; char *argv[]; { register int i, j, i1, j1;
  int mean;
  int offset;
  int imean, polarity;
  int index;
  int *pmean, *pp, *pindex;
  register int pixel, *pc;
  FILE *fpoen(), *fd;
  int atoi();

if (argc!=4){
       printf("Supply parameters!\n");
       return;
       }

ImgSize = atoi(argv[3]);
 image = (char*)malloc(ImgSize*ImgSize*sizeof(char));
ImgSize2 = ImgSize>>2;
 pMap= (int*)malloc(ImgSize2*ImgSize2*sizeof(int));
 indexMap = (int*)malloc(ImgSize2*ImgSize2*sizeof(int));
 meanMap = (int*)malloc(ImgSize2*ImgSize2*sizeof(int));

/* read codebook */
 fd = fopen("CodeBook", "r");
 fread(CodeBook, 1, sizeof(CodeBook), fd);
 fclose(fd);

/* read gMin, dg, MEL*/
 fd = fopen("code.dat", "r");
 fscanf(fd, "%d%d",&MEL,&MEL);
 fscanf(fd,"%d", &MEL);
  printf("MEL %d\n", MEL);
 fclose(fd);
/* open input file */
 fd = fopen(argv[1], "r");

/* for each block, add mean and residual */
 pmean=meanMap;
 pp = pMap;
 pindex = indexMap;
 for (i=0;i<(ImgSize>>2)*(ImgSize>>2);i++) {
```

```
      fread(pp++, 1, sizeof(int), fd);
      fread(pmean++, 1, sizeof(int), fd);
      fread(pindex, 1, sizeof(int), fd);
      if (*pindex%MEL==0) *pindex=127;
      pindex++;
   }
fclose(fd);

/* set up mean intensity and filter it */
  for (i=0;i<ImgSize;i+=BlkSize) {
    for (j=0;j<ImgSize;j+=BlkSize){
        mean = MeanMap(i>>2, j>>2);
        for (i1=0;i1<BlkSize;i1++) {
          for (j1=0;j1<BlkSize;j1++) {
            Image(i+i1,j+j1) = mean;
          }
        }
      }
    } printf("filtering\n");
/* apply averaging filtering */
  for (j=1;j<ImgSize-1;j++){
    for (i=0;i<ImgSize;i++) {
     Image(i,j) = ((int)Image(i,j-1)+Image(i,j)+Image(i,j+1))/3;
    }
  }
  for (i=1;i<ImgSize-1;i++) {
    for (j=0;j<ImgSize;j++) {
        Image(i,j) = ((int)Image(i-1,j)+Image(i,j)+Image(i+1,j))/3;
      }
  } printf("filtering done!\n");

for (i=0;i<ImgSize;i+=BlkSize) {
   if (i%128 ==0) {
        printf("%d\n",i);
      }
    for (j=0;j<ImgSize;j+=BlkSize) { index = IndexMap(i>>2,j>>2);
    polarity = PMap(i>>2,j>>2);

pc = (int *)CodeBook[index];
    if (polarity) {
      for (i1=0;i1<BlkSize;i1++) {
```

```c
      for (j1=0;j1<BlkSize;j1++){
        pixel= dmean+Image(i+i1,j+j1)- *pc++;
        if(pixel>255) {
            pixel=255;
            }
         else if (pixel<0) {
            pixel=0;
            }
         Image(i+i1,j+j1)= (char) pixel;
         }
        }
       }
    else {
       for (i1=0;i1<BlkSize;i1++) {
         for (j1=0;j1<BlkSize;j1++){
           pixel= dmean+Image(i+i1,j+j1)+ *pc++;
           if(pixel>255) {
              pixel=255;
              }
            else if (pixel<0) {
              pixel=0;
              }
            Image(i+i1,j+j1)= (char) pixel;
            }
           }
          }
    }
  }

/* output image */
 fd = fopen(argv[2], "w");
 fwrite(image, 1, ImgSize*ImgSize*sizeof(char),fd);
 fclose(fd);
 }

/*

File: code.c

Visual Pattern Coding Program

This program implements VPIC coding program.
   8 basic visual patterns as defined in "edge.h"
   are used to code the images. The other visual patterns
   with the gradient information are generated and stored
   in the codebook by "book.c". The program uses integer
``` arithmetic and it also uses one byte to simulate one bit. At the end of the program, the total number of bits used and other relevant information are given.

The data file "code.dat" defines the minimum and maximum gradients, number of the gradient magnitudes etc.

*/

```c
#include <stdio.h>
include <math.h> int ImgSize;
define BlkSize 4
#define Image(i,j) (*image+(i)*ImgSize+(j))
char *image;
int    CodeBook[256][16];
int    gMin, gMax, dg;              /*minimum gradient and increment*/
int    MEL, MU;          /*number of quantization levels*/
int ne0, ne45, ne135, ne90;
int nUniform=0;
int nNonUniform=0;            /*number of nonuniform blocks*/
unsigned mask4,uniformMask, nonUniformMask;
int    gDist[20];         /*gradient distribution*/ int Buffer[512*512*3>>4]; /* image buffer*/
main(argc, argv) int argc; char *argv[]; { register int i, j, i1, j1;
  register int *pBuffer= Buffer;
  register int *pbi;
  register char *pj;
  char *pi;
  int mean;
  int polarity;
  int index;
  FILE *fpoen(), *fd;
  long time(), start, finish;
  int atoi();

if (argc!=4){
       printf("Supply parameters!\n");
       return;
       }
  ImgSize = atoi(argv[3]);
```

```c
    image = (char*)malloc(ImgSize*ImgSize*sizeof(char));

/* read image */
 fd = fopen(argv[1], "r");
 fread(image, 1, ImgSize*ImgSize*sizeof(char), fd);
 fclose(fd);
/* read codebook */
 fd = fopen("CodeBook", "r");
 fread(CodeBook, 1, sizeof(CodeBook), fd);
 fclose(fd);

/* read gMin, dg, MEL*/
 fd = fopen("code.dat", "r");
 fscanf(fd,"%d", &gMin);
 fscanf(fd,"%d", &gMax);
 fscanf(fd,"%d", &MEL);
 fscanf(fd,"%x", &uniformMask);
 fscanf(fd,"%x", &nonUniformMask);
 printf("gMin %d\n", gMin);
 printf("gMax %d\n", gMax);
 printf("MEL %d\n", MEL);
 fclose(fd);
 dg = (gMax-gMin)/MEL;
 for (i=0;i<20;i++) gDist[i]=0;

/* open output file */
 fd = fopen(argv[2], "w");

/* for each block, remove the mean and find the index to the template*/
 ne0=ne90=ne45=ne135;
/* coding*/
 printf("Coding now...\n");
 start = time((long*)0);
 for (i=0;i<ImgSize;i+=BlkSize) {
  if (i%128 == 0) {
    printf("i = %d\n", i);
  }
  for (j=0;j<ImgSize;j+=BlkSize) {

VPIC(image+i*ImgSize+j, &mean, &index, &polarity);
     if (index%MEL==0) {     /* uniform block*/
       mean = mean & uniformMask;
       nUniform++;
      }
     else {
       mean = mean & nonUniformMask;
       nNonUniform++;
      }
/*
```

```
        write to buffer
*/
        *pBuffer++ = polarity;
        *pBuffer++ = mean;
        *pBuffer++ = index;
        }
    }
  finish = time((long*)0);
  printf("Codding Time:   \t%4d Seconds\n", finish-start);
  printf("edges detected:\n");
  printf("\thorizontal\tvertical\t45 degree\t135degree\n");
  printf("\t%d\t\t%d\t\t%d\t\t%d\n", ne0, ne90, ne45, ne135);
  for (i=0;i<20;i++) { printf("%4d ", gDist[i]); }
  printf("\n");
  printf("%d uniform blocks\n",nUniform);
  printf("%d nonuniform blocks\n",nNonUniform);
/* output file */ fwrite(Buffer, 1, sizeof(Buffer), fd);
  fclose(fd);
  }

VPIC(block, mean, index, polarity)
  char *block; int *mean, *index, *polarity; {
  int angle;
  int g;
  register int offset;
  int type;

/* Call Edge to find the gradient and oritation
   of the block.
*/
  *polarity= 0;
  Edge(block, 0, &g, &angle, polarity, mean);

if (g>gMax) g=gMax;
  else if(g<gMin) g = gMin;
  offset = (g-gMin)/dg;
  if (offset>=MEL) offset=MEL-1;
  gDist[offset]++;
  switch(angle) {
   case 0:
        *index=offset;
        ne0++;              /* horizontal edge*/
        break;
    case 90:            /* 90 degree */
```

```
              *index= 2*MEL + offset;
           ne90++;
           break;
    case 45:
           *index=4*MEL+offset;
           ne45++;
           break;
    case 135:
           *index=6*MEL+offset;
           ne135++;              /* 135 edge*/
           break;
    }

/* check polarity */
  Polarity(block, *mean, *polarity, &type);
       switch(type) {
         case 2:
              *index+= MEL;
              break;
         default:
              break;
         }
  return;
}

Polarity(block, mean, polarity, type)
  char *block; int *type, mean,polarity; {
  register char *p=block;
  register int posPixel;
  register int i;

posPixel=0;
  i=4;
  while(i--) {
    if ((int)(*p++) >= mean) posPixel++;
    }
  i=4;
  p+=ImgSize;
  while(i--) {
    if ((int)(*--p) >= mean) posPixel++;
    }
  i=4;
  p+=ImgSize;
  while(i--) {
    if ((int)(*p++) >= mean) posPixel++;
    }
  i=4;
```

```
  p+=ImgSize;
  while(i--) {
    if ((int)(*--p) >= mean) posPixel++;
  }
  if (posPixel<= 8) {
        if (polarity) {
          *type= 2;    /*3,2*/
          }
        else {
          *type=1;
          }
        return;
        }
  else {
        if (polarity) {
          *type=1;
          }
        else {
          *type = 2;
          }
        return;
        }
}
  2
  90
  8
  0FC
  0F0

/*
  File: deco.c

VPIC Decoding Program.
      Post-Processing is used.

*/ include <stdio.h>
include <math.h> int ImgSize;
int ImgSize2;
define Image(i,j) (*(image+(i)*ImgSize+(j)))
# define PMap(i,j) (*(pMap+(i)*ImgSize2+(j)))
# define MeanMap(i,j) (*(meanMap+(i)*ImgSize2+(j)))
# define IndexMap(i,j) (*(indexMap+(i)*ImgSize2+(j)))
```

```c
define BlkSize 4 char *image;
int *pMap, *indexMap, *meanMap;
int   CodeBook[256][16];

int   MEL;
int   dmean=2;    /*mean compensate*/ main(argc, argv) int argc; char *argv[]; { register int i, j, i1, j1;
  int mean;
  int offset;
  int imean, polarity;
  int index;
  int *pmean, *pp, *pindex;
  register int pixel, *pc;
  FILE *fpoen(), *fd;
if (argc!=4){
      printf("Supply parameters!\n");
      return;
      }

ImgSize = atoi(argv[3]);
ImgSize2 = ImgSize>>2;

image = (char*)malloc(ImgSize*ImgSize*sizeof(char));
  meanMap = (int*)malloc(ImgSize2*ImgSize2*sizeof(int));
  indexMap = (int*)malloc(ImgSize2*ImgSize2*sizeof(int));
  pMap = (int*)malloc(ImgSize2*ImgSize2*sizeof(int));

/* read codebook */
 fd = fopen("CodeBook", "r");
 fread(CodeBook, 1, sizeof(CodeBook), fd);
 fclose(fd);

/* read gMin, dg, MEL*/
 fd = fopen("code.dat", "r");
 fscanf(fd, "%d%d",&MEL,&MEL);
 fscanf(fd,"%d", &MEL);
 printf("MEL %d\n", MEL);
 fclose(fd);
/* open input file */
 fd = fopen(argv[1], "r");

/* for each block, add mean and residual */
 pmean=meanMap;
```

```c
  pp = pMap;
  pindex = indexMap;
  for (i=0;i<(ImgSize>>2)*(ImgSize>>2);i++) {
    fread(pp++, 1, sizeof(int), fd);
    fread(pmean++, 1, sizeof(int), fd);
    fread(pindex++, 1, sizeof(int), fd);
  }
 fclose(fd);

/* set up mean intensity and filter it */
  for (i=0;i<ImgSize;i+=BlkSize) {
    for (j=0;j<ImgSize;j+=BlkSize){
        mean = MeanMap(i>>2,j>>2);
        for (i1=0;i1<BlkSize;i1++) {
          for (j1=0;j1<BlkSize;j1++) {
            Image(i+i1,j+j1) = mean;
          }
        }
      }
   } printf("filtering\n");
/* apply averaging filtering */
   for (j=1;j<ImgSize-1;j++){
     for (i=0;i<ImgSize;i++) {
      Image(i,j) = ((int)Image(i,j-1)+Image(i,j)+Image(i,j+1))/3;
    }
   }
   for (i=1;i<ImgSize-1;i++) {
     for (j=0;j<ImgSize;j++) {
         Image(i,j) = ((int)Image(i-1,j)+Image(i,j)+Image(i+1,j))/3;
        }
   } printf("filtering done!\n");
   for (i=0;i<ImgSize;i+=BlkSize) {
    if (i%128 ==0) {
        printf("%d\n",i);
      }
     for (j=0;j<ImgSize;j+=BlkSize) { index = IndexMap(i>>2,j>>2);
      polarity = PMap(i>>2,j>>2);

pc = (int *)CodeBook[index];      /*pointer to codebook*/
       if (polarity) {          /* reversed pattern*/
         for (i1=0;i1<BlkSize;i1++) {
            for (j1=0;j1<BlkSize;j1++){
```

```
            pixel= dmean+Image(i+i1,j+j1)- *pc++;
            if(pixel>255) {
                pixel=255;
            }
            else if (pixel<0) {
                pixel=0;
            }
            Image(i+i1,j+j1)= (char) pixel;
          }
        }
      }
      else {
        for (i1=0;i1<BlkSize;i1++) {
          for (j1=0;j1<BlkSize;j1++){
            pixel= dmean+Image(i+i1,j+j1)+ *pc++;
            if(pixel>255) {
                pixel=255;
            }
            else if (pixel<0) {
                pixel=0;
            }
            Image(i+i1,j+j1)= (char) pixel;
          }
        }
      }
    }
  }

/* output image */
  fd = fopen(argv[2], "w");
  fwrite(image, 1, ImgSize*ImgSize*sizeof(char), fd);
  fclose(fd);
}
```

WHAT IS CLAIMED IS:

1. A method of processing a digital image, comprising:
partitioning a digital image into a plurality of image blocks;
calculating mean intensity value and image gradient magnitude for each block;
coding blocks having gradient magnitudes less than a predetermined minimum according to the respective mean intensity value;
coding blocks having gradient magnitudes above said predetermined minimum according to the respective mean intensity value, gradient magnitude, and gradient orientation;
transmitting and receiving coded image blocks;
decoding said coded image blocks, including the steps of:
creating a uniform image block for each coded image block according to a respective mean intensity value;
generating a non-uniform image block for each coded image block from a respective visual image code;
multiplying said non-uniform image block by said gradient magnitude to produce a scaled image block;
adding said uniform image block to said scaled image block to produce a decoded image block; and
arranging a plurality of each said decoded image block to substantially reproduce said digital image.

2. An apparatus for processing digital images, comprising:
a video image digitizer for producing a pixel matrix corresponding to an image, each pixel having a magnitude related to an intensity of a relevant portion of said image;
means for partitioning said array of pixels into a plurality of pixel blocks;
means for calculating an average intensity of pixels in each pixel block;

means for calculating a directional image gradient for each pixel block;

means for coding each pixel block using mean intensity if a magnitude of a respective directional gradient is less than a predetermined minimum, and for coding each pixel block using mean intensity and direction of said gradient if said magnitude of said respective directional gradient is greater than said predetermined minimum;

a transmitter for transmitting coded pixel block information;

a receiver for receiving said coded pixel block information;

a decoder for decoding coded pixel block information, including means for selecting a visual pattern for each block according to respective gradient direction information, and means for multiplying said visual pattern by the magnitude of said directional gradient prior to adding said mean intensity value to said visual pattern to produce a decoded visual block; and means for assembling and displaying said decoded visual blocks to substantially reproduce said image.

* * * * *

UNITED STATES PATENT AND TRADEMARK OFFICE
CERTIFICATE OF CORRECTION

PATENT NO. : 5,144,688

DATED : September 1, 1992

INVENTOR(S) : Alan C. Bovir and Dapang Chen

It is certified that error appears in the above-identified patent and that said Letters Patent is hereby corrected as shown below:

Title page, item [19] and [75] change "Alan C. Bovir" to --Alan C. Bovik--

Signed and Sealed this

Twenty-first Day of September, 1993

Attest:

BRUCE LEHMAN

Attesting Officer      Commissioner of Patents and Trademarks